United States Patent
Lee et al.

(10) Patent No.: US 12,132,602 B2
(45) Date of Patent: Oct. 29, 2024

(54) EDGE INTEGRATION CONTROL DEVICE AND METHOD FOR SEARCHING FOR A MEC APPLICATION BASED ON LINKAGE TRIGGERING

(71) Applicant: SK TELECOM CO., LTD., Seoul (KR)

(72) Inventors: Hyeon Soo Lee, Seoul (KR); Joon Woong Kim, Seoul (KR); Dong Hi Sim, Seoul (KR); Min Geun Yoon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/017,917

(22) PCT Filed: Jun. 9, 2021

(86) PCT No.: PCT/KR2021/007206
§ 371 (c)(1),
(2) Date: Jan. 25, 2023

(87) PCT Pub. No.: WO2022/039359
PCT Pub. Date: Feb. 24, 2022

(65) Prior Publication Data
US 2023/0283511 A1   Sep. 7, 2023

(30) Foreign Application Priority Data
Aug. 21, 2020   (KR) .................. 10-2020-0105226

(51) Int. Cl.
*H04L 41/02* (2022.01)
*H04L 67/51* (2022.01)

(52) U.S. Cl.
CPC .............. *H04L 41/02* (2013.01); *H04L 67/51* (2022.05)

(58) Field of Classification Search
CPC ................................. H04L 67/51; H04L 41/02
USPC .......................................................... 709/220
See application file for complete search history.

(56) References Cited

U.S. PATENT DOCUMENTS

| | | | |
|---|---|---|---|
| 10,341,868 B2 | 7/2019 | Ross et al. | |
| 10,716,034 B2 | 7/2020 | Trang et al. | |
| 2019/0141142 A1* | 5/2019 | Filippou | H04W 4/40 |
| 2020/0296653 A1 | 9/2020 | Huang | |
| 2020/0389531 A1 | 12/2020 | Lee et al. | |

(Continued)

FOREIGN PATENT DOCUMENTS

| | | |
|---|---|---|
| KR | 10-2018-0112825 | 10/2018 |
| KR | 10-2018-0119162 | 11/2018 |
| KR | 10-2020-0007634 | 1/2020 |

(Continued)

OTHER PUBLICATIONS

International Search Report (with English Translation) dated Sep. 8, 2021 issued in Application No. PCT/KR2021/007206.

(Continued)

*Primary Examiner* — Hee Soo Kim
(74) *Attorney, Agent, or Firm* — KED & ASSOCIATES, LLP

(57) ABSTRACT

The present invention proposes a scheme for realizing a structure and a technology which can support direct linkage between services in an inter-MEC environment, the services being mounted in different MEC systems, respectively.

14 Claims, 11 Drawing Sheets

(56) References Cited

U.S. PATENT DOCUMENTS

2023/0305899 A1\* 9/2023 Zhu .................. H04L 67/60
2024/0195879 A1\* 6/2024 Sabella ............. H04L 67/51

FOREIGN PATENT DOCUMENTS

| KR | 10-2020-0062272 | | 6/2020 | | |
|---|---|---|---|---|---|
| WO | WO-2021067140 | A1 \* | 4/2021 | ............ | H04L 67/10 |
| WO | WO-2022128889 | A1 \* | 6/2022 | ............ | H04L 67/10 |
| WO | WO-2022245796 | A1 \* | 11/2022 | ............ | H04L 67/51 |

OTHER PUBLICATIONS

ETSI Group Specification, dated Jan. 24, 2019, European Telecommunications Standards Institute (ETSI), 650, route des Lucioles, F-06921 Sophia-Antipolis, France; V2.1.1, pp. 1-21. http://www.etsi.org/deliver/etsi_gs/MEC/001_099/003/02.01.01_60/gs_MEC003v020101p.pdf.

\* cited by examiner

EDGE INTEGRATION CONTROL DEVICE AND METHOD FOR SEARCHING FOR A MEC APPLICATION BASED ON LINKAGE TRIGGERING

CROSS-REFERENCE TO RELATED PATENT APPLICATIONS

This application is a U.S. National Stage Application under 35 U.S.C. § 371 of PCT Application No. PCT/KR2021/007206, filed Jun. 9, 2021, which claims priority to Korean Patent Application No. 10-2020-0105226, filed Aug. 21, 2020, whose entire disclosures are hereby incorporated by reference.

TECHNICAL FIELD

The present disclosure relates to a technology for supporting linkage between services in an inter-multi access edge computing (MEC) environment.

This application claims priority to Korean Application No. 10-2020-0105226, filed on Aug. 21, 2020, the entire content of this application is herein incorporated by reference for all purposes.

BACKGROUND ART

MEC is a technology that can transmit large-capacity data in a low transmission latency, and MEC-related standards are being established by multiple standardization organizations such as 3GPP, ETSI, and ITU.

In addition, with the commercialization of MEC in earnest after the launch of 5G, it is recognized that there are limitations in providing actual MEC services with only the current MEC standard. Therefore, standardization for communication between MEC systems is being carried out in earnest.

As part thereof, the ETSI is conducting a study related to a new work item called Inter MEC.

However, the inter MEC technology, which is currently being discussed, is limited to guarantee service continuity when the location of a terminal using an MEC service is changed.

That is, the inter MEC technology, which is currently being discussed, is a technology that ensures service continuity by implementing handover between MEC systems according to the movement of the location of the terminal when the terminal using the MEC service moves.

In the end, an inter-MEC technology, which is being further discussed, is also only for supporting the continuity of MEC services when the terminal moves, and it is impossible to support the linkage function between services installed in different MEC systems.

Therefore, in the current MEC standard, when linkage between MEC services is required, direct linkage between the services is impossible, and an indirect linkage scenario through a public cloud is provided.

That is, according to the current MEC standard, when the linkage between MEC services is required, an indirect linkage scenario between the services is provided. Therefore, there is a limit to maintaining the advantages of MEC to provide high-volume data with low latency Accordingly, the present disclosure intends to support linkage between services in an inter MEC environment by realizing a direct linkage between MEC services mounted in different MEC systems.

DISCLOSURE

Technical Problem

An aspect of the present disclosure is to realize a structure that allows direct linkage between MEC services installed in different MEC systems.

Technical Solution

According to an embodiment of the present disclosure, an edge integration control device includes: an information register configured to acquire, from at least one MEC Orchestrator (MEO), information related to at least one MEC system associated with the MEO and at least one of MEC applications installed in the MEC system and register the information; and a linkage controller configured to search for, based on the information registered for each of the at least one MEO, at least one of an MEC application and an MEC system to be linked when predefined linkage triggering occurs.

Specifically, the linkage triggering may occur when a first MEC application in a first MEC system associated with a first MEO among the at least one MEO requests linkage with a second MEC application and when the inter-MEC application request is received from the first MEO.

Specifically, the inter-MEC application request from the first MEO may be received when the first MEC application requests the linkage with the second MEC application and when the second MEC application is not installed in the MEC system associated with the first MEO.

Specifically, the inter-MEC application request may include at least one of identification information of the first MEC application and the second MEC application, Key performance indicator (KPI), and location information of a terminal served by the first MEC application in relation to the inter-MEC application request.

Specifically, the information acquired and registered from the at least one MEO may include information about each MEO, system-related information including at least one of MEC system resource information, network status information, and system location information for each MEC system, and MEC application-related information including at least one of KPI and identification information of each MEC application installed in MEC system for each MEC system.

Specifically, the linkage controller may search for a second MEC system in which the second MEC application to be linked is installed, based on the information registered for each of the at least one MEO, and when the second MEC system in which the second MEC application is installed is found, may transmit information about the second MEC system to the first MEC system so that the first MEC application is capable of being linked with the second MEC application through communication between the first MEC system and the second MEC system.

Specifically, when failing in searching for the second MEC system in which the second MEC application is installed, the linkage controller may transmit the inter-MEC application request to another edge integration control device such that the result of searching for the second MEC system, in which the second MEC application to be linked is installed, among MEC systems registered in the other edge integration control device is transmitted to the first MEC system.

Specifically, the search result transmitted to the first MEC system may include information about the second MEC system necessary for communication between the first MEC system and the second MEC system when the second MEC system, in which the second MEC application is installed, is found in the other edge integration control device, and the linkage controller may transmit the information about the second MEC system included in the search result to the first MEC system so that the first MEC application is capable of being linked with the second MEC application through the communication between the first MEC system and the second MEC system.

Specifically, the linkage controller may support linkage between the first MEC application and a second application in a cloud environment when failing in searching for the second MEC system, in which the second MEC application is installed, in the other edge integration control device.

According to an embodiment of the present disclosure, an edge integration control device includes: an information register configured to acquire, from at least one MEO, information related to at least one MEC system associated with the MEO and at least one of MEC applications installed in the MEC system and register the information; and a linkage controller configured to, when an inter-MEC application request according to a request which a first MEC application makes for linkage with an MEC application different therefrom is transmitted from another edge integration control device, search for, based on the information registered for each of the at least one MEO, at least one of an MEC application and an MEC system to be linked according to the inter-MEC application request.

Specifically, when searching for a second MEC system in which the second MEC application to be linked is installed, the linkage controller may perform the searching, based on the degree of proximity between a terminal and a system that is predefined based on system location information of each MEC system registered in the information register and location information of the terminal being served by the first MEC application in relation to the inter-MEC application request.

Specifically, the linkage controller may transmit a search result according to the inter-MEC application request to a first MEC system in which the first MEC application is installed.

Specifically, when succeeding in searching for the second MEC system in which the second MEC application to be linked is installed, the linkage controller may control an MEO associated with the second MEC system among the at least one MEO to transmit a search result including information about the second MEC system necessary for communication between the first MEC system and the second MEC system to an MEO associated with the first MEC system through an interface between the MEOs.

Specifically, when succeeding in searching for the second MEC system in which the second MEC application to be linked is installed, the linkage controller may transmit a search result including information about the second MEC system necessary for communication between the first MEC system and the second MEC system to an MEO associated with the first MEC system via the other edge integration control device through an interface between the edge integration control devices.

According to an embodiment of the present disclosure, an operation method of an edge integration control device includes: an information registration operation for acquiring, from at least one MEO, information related to at least one MEC system associated with the MEO and at least one of MEC applications installed in the MEC system and registering the information; and a linkage control operation for searching for, based on the information registered for each of the at least one MEO, at least one of an MEC system and an MEC application to be linked when predefined linkage triggering occurs.

According to an embodiment of the present disclosure, an operation method of an edge integration control device includes: an information registration operation for acquiring, from at least one MEO, information related to at least one MEC system associated with the MEO and at least one of MEC applications installed in the MEC system and registering the information; and a linkage control operation for, when an inter-MEC application request according to a request which a first MEC application makes for linkage with an MEC application different therefrom is transmitted from another edge integration control device, searching for, based on the information registered for each of the at least one MEO, at least one of an MEC system and an MEC application to be linked according to the inter-MEC application request.

Advantageous Effects

According to the embodiments of the present disclosure, a structure that allows direct linkage between MEC services mounted in different MEC systems is realized, thereby deriving the effect of supporting linkage between the services in an inter MEC environment.

For this reason, the embodiments of the present disclosure may support linkage between services in an inter MEC environment, thereby contributing to MEC service quality improvement and MEC commercialization and enabling even an expectation of the effect of building a more complete MEC environment.

MODE FOR INVENTION

Figure 1:
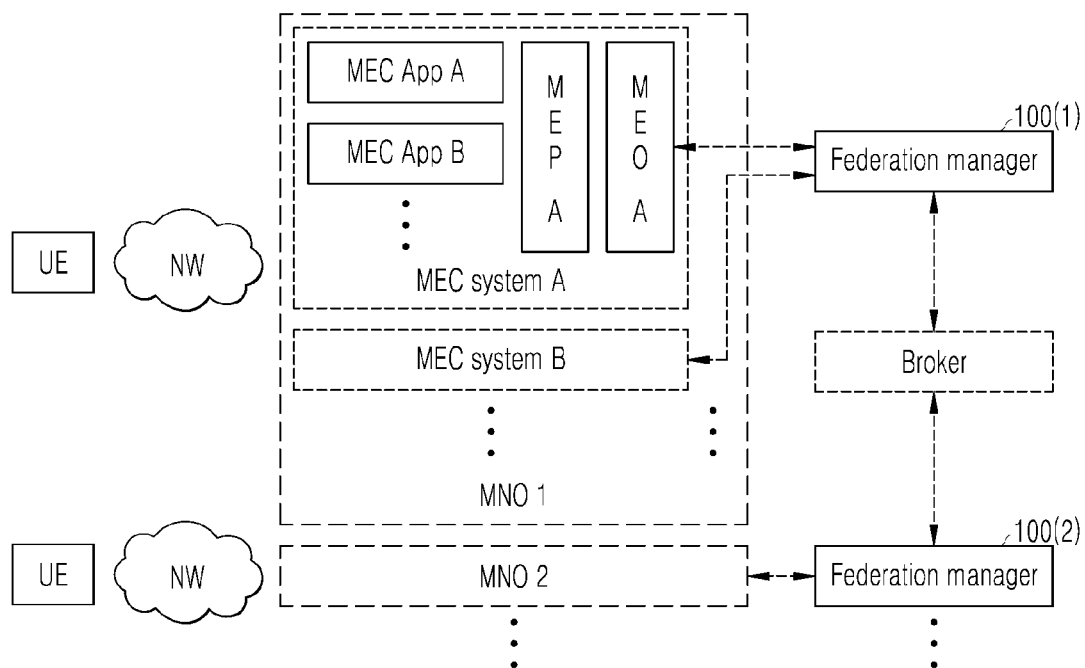
FIG. 1 is a schematic view of an embodiment showing an MEC environment to which the present disclosure is applied.

Hereinafter, an embodiment of the present disclosure will be described with reference to the accompanying drawings.

The present disclosure relates to a technology that supports the linkage between services in an inter Multi-access Edge Computing (MEC) environment.

With the commercialization of MEC starting in earnest after the launch of 5G, it is recognized that there are limitations in providing actual MEC services with only the current MEC standard. Therefore, standardization work on the requirements for communication between MEC systems is being carried out in earnest.

As part thereof, the ETSI is conducting a study related to a new work item called Inter MEC.

However, the inter MEC technology, which is currently being discussed, is limited to a part that guarantees service continuity when the location of a terminal using an MEC service is changed.

That is, the inter MEC technology, which is currently being discussed, is a technology that ensures service continuity by implementing handover between MEC systems according to the movement of the location of the terminal when the terminal using the MEC service moves.

In the end, an inter-MEC technology, which is being further discussed, is also only at a level at which the continuity of MEC services can be supported when the terminal moves, and it is impossible to support the linkage function between services installed in different MEC systems.

For example, it may be assumed that a navigation service and a voice recognition service are installed in different MNO operators and different MEC providers, respectively.

Under this assumption, in order to support a scenario in which the navigation service calls the voice recognition service, it is necessary for the navigation service (MEC App X) to know a communication company and an MEC system in which the voice recognition service (MEC App Y) is installed.

However, with the current technology, there is no way for the navigation service (MEC App X) to know the communication company and the system in which the voice recognition service (MEC App Y) is installed, and thus linkage in which the navigation service (MEC App X) calls the voice recognition service (MEC App Y) is impossible.

Even if it is possible for the navigation service (MEC App X) to know the communication company and the MEC system in which the voice recognition service (MEC App Y) is installed, the same is located at the host end of an MNO infrastructure due to the nature of the MEC, and communication between different MNO host ends is not currently supported. Therefore, linkage in which the navigation service (MEC App X) calls the voice recognition service (MEC App Y) is impossible.

As such, in the current MEC standard, when linkage between MEC services is required, direct linkage between services is impossible, and thus an indirect linkage scenario between the services through a public cloud is provided.

That is, according to the current MEC standard, when the linkage between MEC services is required, the indirect linkage scenario between the services is provided. Therefore, there is a limit to maintaining the purpose and characteristics of MEC to provide high-volume data with low latency.

Considering the recent/future use environment in which links between services, such as AR/VR, AI, and V2X, which require high-capacity and fast data usage, and various other external services are becoming increasingly frequent, the above problem, in which direct linkage between MEC services is impossible, causes a decrease in service quality and serves as a limitation which reduces the spread of use of MEC services.

Accordingly, the present disclosure is intended to support linkage between services in an inter MEC environment by realizing a structure that allows direct linkage between MEC services installed in different MEC systems.

First, an MEC environment to which the present disclosure is applied will be described with reference to FIG. 1.

As shown in FIG. 1, in the present disclosure, an edge integration control device (hereinafter, federation manager) is provided for each MNO (or MEC provider) for operating MEC, thereby implementing a structure in which each of federation managers 100(1), 100(2), . . . can search for/transmit information among MEC systems managed thereby.

A mobile network operator (MNO) implies a mobile communication operator that provides MEC infrastructure, an MEC system is a system possessed by MEC providers that provide an MEC environment in the MEC infrastructure, and App refers to an MEC service that is installed in the MEC system and may be used by a user.

Since an MNO that provides MEC infrastructure may directly become an MEC provider or rent the MEC infrastructure to appropriate MEC providers, the MNO and the MEC provider may be said to be different from each other.

As seen in FIG. 1, the federation managers 100(1), 100(2), . . . of the present disclosure realize functions for direct linkage between MEC systems (MEC services).

For example, when there are multiple MEC providers in one MNO, each of the federation managers 100(1), 100(2), . . . may store/manage information about an MEC system provided by each MEC provider, and may transmit/exchange the information managed/held thereby to/with another federation manager.

Of course, each of the federation managers 100 (1), 100 (2), . . . may be provided for each MEC system or for multiple MNOs.

A broker implies an entity additionally provided for communication between each of federation managers when the number of the federation managers is three or greater.

Assuming an environment in which the basic role of the broker is the same as those of federation managers and in which the federation managers communicate with each other in a mesh structure, the broker will be unnecessary.

For reference, considering MEC architecture being discussed in the current standard, the federation managers 100(1), 100(2), . . . /the broker and MEO of the present disclosure may be classified as the MEC system level, and MEC App and MEP may be classified as a host level.

In the present disclosure, various linkage scenarios that provide direct linkage between MEC services installed in different MEC systems are realized based on the above-described inter-MEC system information search/transmission structure based on the above-described federation manager 100(1), 100(2), . . . .

Figure 2:
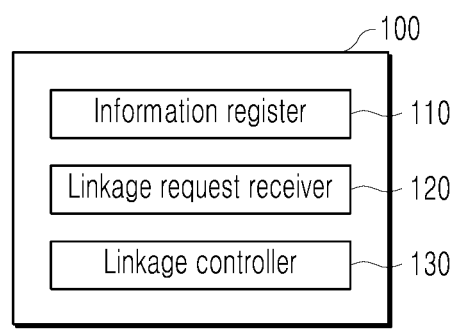
FIG. 2 is a block diagram showing the configuration of an edge integration control device (a federation manager) according to an embodiment of the present disclosure.

Hereinafter, elements of a federation manager by which the inter-MEC system information search/transmission structure and a linkage scenario, proposed by the present disclosure, are realized will be described in detail with reference to FIG. 2.

A federation manager 100 according to an embodiment of the present disclosure may include an information register 110, a linkage request receiver 120, and a linkage controller 130.

All or at least some of the above-mentioned elements of the federation manager 100 of the present disclosure may be implemented in the form of hardware modules or software modules, or may be implemented in the form of a combination of hardware modules and software modules.

The software modules may be understood as, for example, instructions that are executed by a processor for controlling operation in the federation manager 100, and these instructions may be installed in a memory of the federation manager 100.

Eventually, the federation manager 100 according to the embodiment of the present disclosure realizes, through the above-mentioned elements, the inter-MEC system information search/transmission structure and the linkage scenario that are proposed by the present disclosure.

Hereinafter, each of the elements in the federation manager 100 according to an embodiment of the present disclosure will be described in more detail.

The information register 110 is responsible for receiving, from at least one MEO, information related to at least one multi-access edge computing (MEC) system and at least one of MEC applications installed in the MEC system, and registering the information.

Hereinafter, for convenience of description, the federation manager 100(1), among the federation managers 100(1), 100(2), . . . according to MNOs shown in FIG. 1, will be described.

The information register 110 may receive, from MEO A, B, . . . of MEC systems A, B, . . . possessed by multiple MEC providers existing in MNO 1, information related to an MEC system associated with each MEO and at least one of MEC applications (hereinafter, MEC Apps) installed in the MEC system, and may register/manage the information.

That is, the information register 110 may receive, from an MEO A, information about an MEC system A associated with the MEO A and about MEC Apps A, B, . . . installed in the MEC system A, and register/manage the information, and may register/manage information received from each of the MEOs B, . . . in this way, thereby registering/managing information related to the MEC systems A, B, . . . existing in MNO 1.

The information received from the MEO (e.g., the MEO A) and registered may include information about each MEO (e.g., the MEO A), may further include system-related information including at least one of MEC system resource information, network status information, and system location information for each of the MEC systems (e.g., the MEC Apps A, B, . . . ), and may further include MEC application-related information including, for each MEC system (e.g., MEC Apps A, B, . . . ), at least one of identification information and KPI loaded in the MEC system.

If a more specific embodiment is described, each MEC provider, that is, each MEO (e.g., the MEO A), registers, in the federation manager 100(1), information about each MEC system associated therewith.

The information about each MEC system registered by each MEO (e.g., the MEO A) may be as follows.

MEO information: MEO identification information (e.g., MEO identifier), etc.

System-related information: Supportable (computing) resource information, current NW status information, MEC system location information (e.g., IP information, etc.), etc.

MEC application-related information: MEC App identification information (e.g., App ID), MEC APP-related KPI, etc.

The information about each MEC system, registered in the information register 110, may be updated and managed with the latest information through various criteria/events.

As a result, each of the federation managers 100(1), 100(2), . . . of the present disclosure may register/manage information about MEC systems possessed by multiple MEC providers existing in an MNO managed thereby, and may provide/implement, based thereon, a structure that enables searching for/transmitting information among the MEC systems according to a necessary situation.

The linkage controller 130 is responsible for a function of searching for, based on information registered for each of the at least one MEO, at least one of an MEC system and an MEC application that are to be linked when predefined linkage triggering occurs.

The linkage triggering may occur when a first MEC application in a first MEC system associated with a first MEO among the at least one MEO requests linkage with a second MEC application and thus the inter-MEC application request is received from the first MEO.

Also, hereinafter, for convenience of description, the federation manager 100 (1) among the federation managers 100 (1), 100 (2), . . . for MNOs shown in FIG. 1 will be described.

The linkage request receiver 120 may receive, from a first MEO (e.g., the MEO A), an inter-MEC application request occurring when a first MEC application (e.g., an MEC App X) in a first MEC system (e.g., the MEC system A) associated with the first MEO (e.g., the MEO A) among MEOs A, B, . . . existing in MNO 1 requests linkage with the second MEC application (e.g., an MEC App Y) different from the first MEC application.

The inter-MEC application request may include at least one of identification information of the first MEC application and the second MEC application, KPI, and location information of a terminal being served by the first MEC application in relation to the inter-MEC application request.

When a specific embodiment is described, the MEC App X transmits a request for linkage with the MEC App Y (hereinafter, inter-MEC application request) to the MEO A via an MEC platform (MEP) (the MEP A in FIG. 1).

The inter-MEC application request may include identification information (e.g., an App ID) of the MEC App X, identification information (e.g., an App ID) of the MEC App Y to be linked, KPI of the MEC App X and the MEC App Y, or location information (a UE location) of a terminal served by the MEC App X.

The information about the MEC App Y to be linked that is included in the inter-MEC application request may be pre-configured or may be obtained through the federation manager 100(1) or the like.

The MEO A, from which the MEC App X has received the occurring inter-MEC application request, identifies whether the MEC App Y to be linked, with which linkage is requested, is installed in the MEC system A (or the MEP A) associated with the MEO A, and whether the requested KPI, etc. may be satisfied.

When the MEC App Y to be linked is not installed or does not satisfy the requested KPI, etc., the MEO A transmits the current inter-MEC application request to the federation manager 100(1).

When the MEC App Y to be linked is installed in the MEC system A (or the MEP A) associated with the MEO A and can satisfy the requested KPI, etc., the MEO A may support communication/linkage between the MEC App X and the MEC App Y in the MEC system A (or the MEP A) in the same MEC infrastructure and the same MEC operator environment.

Figure 3:
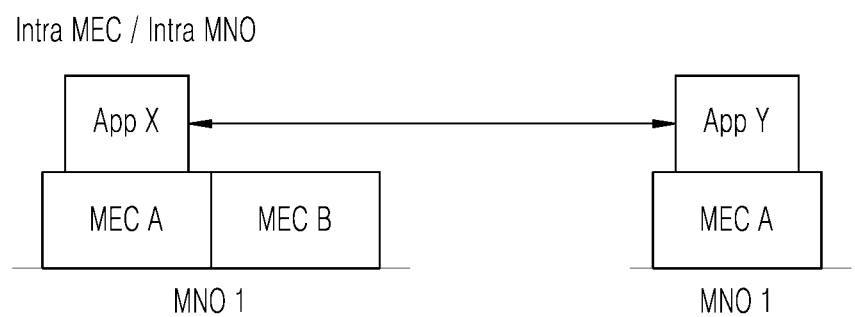
FIGS. 3 to 6 are exemplary diagrams showing linkage scenarios between different services in an inter MEC environment according to an embodiment of the present disclosure.

This case corresponds to an Intra MEC/Intra MNO scenario shown in FIG. 3.

According to the foregoing embodiment, when the MEC App X requests linkage with the MEC App Y, and when the MEC App Y is not installed in the MEC system A (or the MEP A) associated with the MEO A or is installed but does not satisfy the requested KPI, etc., the linkage request receiver 120 may receive, from the MEO A, an inter-MEC application request according to the linkage request.

The linkage controller 130 may search for, based on information registered for each of the MEOs A, B, . . . , at least one of an MEC system and an MEC application which are to be linked when predefined linkage triggering occurs.

That is, when linkage triggering occurs as a result of receiving an inter-MEC application request by the linkage request receiver 120, the linkage controller 130 may search for, based on the information registered for each of the MEOs A, B, . . . , at least one of an MEC system and an MEC application which are to be linked according to the currently received inter-MEC application request.

If a specific embodiment is described, the linkage controller 130 searches for, based on the information registered for each of the MEOs A, B, . . . , a second MEC system in which a second MEC application, i.e., the MEC App Y, to be linked according to the current inter-MEC application request is installed.

More specifically, the linkage controller 130 may perform, based on the information registered for each of MEOs A, B, . . . , a search for identifying whether there is the second MEC system in which the MEC App Y is installed and whether the requested KPI, etc. may be satisfied.

Accordingly, when the second MEC system, in which the MEC App Y is installed, is found among the MEOs A, B, . . . , that is, when the second MEC system (e.g., an MEC system C (or an MEP C), in which the MEC App Y is installed, is present and satisfies the requested KPI, etc., the linkage controller 130 transmits information about the MEC system C (or the MEP C) to the first MEC system, that is, the MEC system A (or the MEP A).

In this way, the linkage controller 130 may transmit the information (e.g., an MEP ID) about the MEC system C (or the MEP C), in which the MEC App Y is installed, to the MEC system A (or the MEP A) so that the MEC App X is linked with the MEC App Y through communication between the MEC system A (or the MEP A) and the MEC system C (or the MEP C).

That is, in the present disclosure, communication/linkage between the MEC App X and the MEC App Y is supported through linkage between different MEC operators (e.g., the MEC A<->the MEC C) in the same MEC infrastructure environment.

Figure 4:
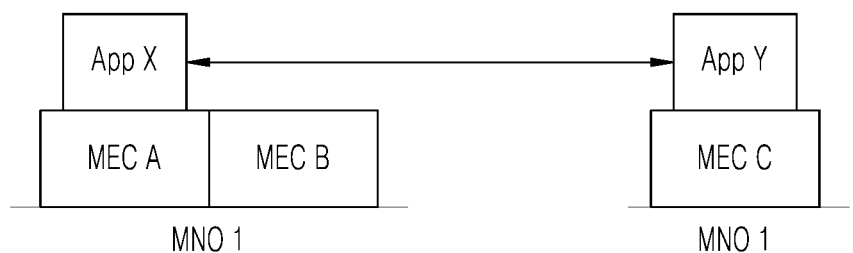

This case corresponds to an Inter MEC/Intra MNO scenario shown in FIG. 4.

When the linkage controller 130 fails in searching for the second MEC system, in which the MEC App Y is installed, among MEOs A, B, . . . , that is, when the second MEC system, in which the MEC App Y is installed, does not exist or exists but does not satisfy the requested KPI, etc., the linkage controller 130 may transmit an inter-MEC application request to other edge integration control devices (hereinafter, other federation managers)

The linkage controller 130 may transmit an inter-MEC application request to one or more federation managers.

Each of other federation managers having received the inter-MEC application request is a federation manager of the present disclosure, and will identically implement the above-mentioned functions of the information register 110, the linkage request receiver 120, and the linkage controller 130.

For convenience of description, another federation manager 100 (2) will be described.

That is, according to an embodiment of the present disclosure, the federation manager 100(2) may have an element identical to the information register 110 of the above-mentioned/described federation manager 100(1).

The linkage request receiver 120 in the federation manager 100(2) may receive, from another federation manager 100(1), an inter-MEC application request having occurred when the first MEC application requests linkage another MEC application different from the first MEC application, that is, an inter-MEC application request made by the above-mentioned MEC App X.

Accordingly, when an inter-MEC application request from the other federation manager 100(1), that is, an inter-MEC application request made by the above-mentioned MEC App X is transmitted from the other federation manager 100(1), the federation manager 100(2) (the linkage controller 130) searches for, based on information registered for each MEO existing in MNO 2 registered in the federation manager 100(2), the second MEC system in which the second MEC application to be linked according to a current inter-MEC application request, i.e., the MEC App Y, is installed.

The federation manager 100(2) (the linkage controller 130) may return/transmit the search result to the federation manager 100(1), or may cause the search result to be returned/transmitted to the first MEC system, that is, the MEC system A (or the MEP A)

When there is a second MEC system (e.g., the MEC system C (or the MEP C), in which the MEC App Y is installed, among MEC systems registered in the federation manager 100(2) and when the requested KPI, etc. are met, the search result transmitted to the federation manager 100(1) or transmitted to the first MEC system, i.e., the MEC system A (or, the MEP A) may include information about the MEC system C (or the MEP C) required for direct communication between the first MEC system, i.e., the MEC system A (or the MEP A) and the MEC system C (or the MEP C).

According to a more specific embodiment, when searching for the second MEC system in which the MEC App Y is installed, the other federation manager 100(2) (the linkage controller 130) may perform the searching, based on the degree of proximity between a terminal and the system that is predefined based on location information (a UE location) of the terminal being served by the MEC App X in relation to a currently received inter-MEC application request, and system location information (e.g., IP information, etc.) of each MEC system registered in the other federation manager 100(2).

That is, in the present disclosure, in order to maintain the characteristics of the MEC service, a search for the MEC App X that can be linked with MEC App Y while guaranteeing a predetermined degree of proximity is performed.

When the search result returned/transmitted from the other federation manager 100(2) includes information about the MEC system C (or the MEP C), the linkage controller 130 of the federation manager 100(1) transmits the information about the MEC system C (or the MEP C) to the MEC system A (or the MEP A).

In this way, the linkage controller 130 may transmit the information (e.g., an MEP ID) about the MEC system C (or the MEP C) in which the MEC App Y is installed, to the MEC system A (or MEP A), so that the MEC App X is linked with the MEC App Y through communication between the MEC system A (or the MEP A) and the MEC system C (or the MEP C).

Thus, in the present disclosure, communication/linkage between the MEC App X and the MEC App Y is supported through linkage between different MEC operators (e.g., MEC A<->MEC C) in different MEC infrastructure (e.g., MNO 1 and MNO 2) environments.

Figure 5:
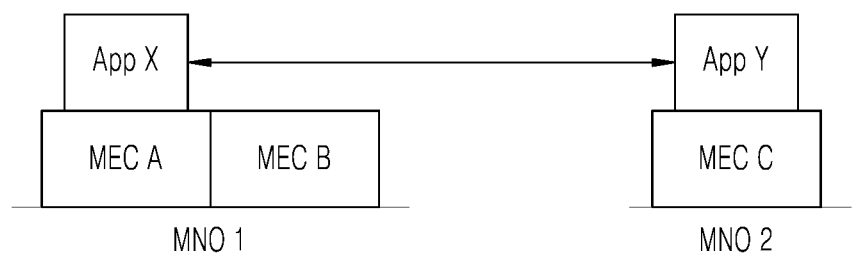

This case corresponds to an Inter MEC/Inter MNO scenario shown in FIG. 5.

When another federation manager 100(2) succeeds in searching, the search result returned/transmitted may include information about an MEC system A (or an MEP A) of the same MEC operator in different MEC infrastructure (e.g., MNO 1 and MNO 2) environments.

The linkage controller 130 may transmit the information about the MEC system A (or the MEP A) to the MEC system A (or the MEP A) so that an MEC App X is linked with an MEC App Y through communication between the MEC system A (or the MEP A) and the MEC system A (or MEP A).

That is, in the present disclosure, communication/linkage between the MEC App X and the MEC App Y is supported through linkage between the same MEC operators (e.g., the MEC A<->the MEC A) in different MEC infrastructure (e.g., MNO 1 and MNO 2) environments.

Figure 6:
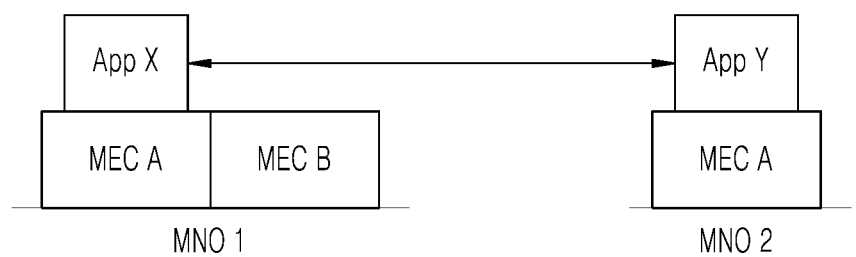

This case corresponds to an Intra MEC/Inter MNO scenario shown in FIG. 6.

When the linkage controller 130 fails to find the second MEC system, in which the MEC App Y is installed, even in the search result obtained by transmitting an inter-MEC application request to one or more other edge integration control devices, the linkage controller 130 may support linkage between the MEC App X and a cloud-App Y in a cloud environment.

Figure 7:
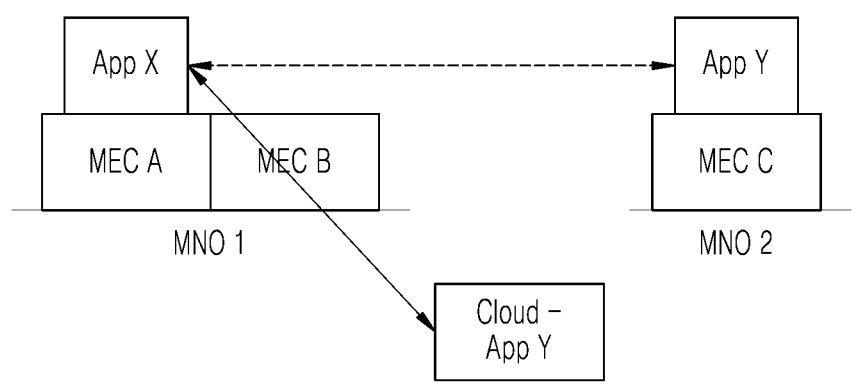
FIG. 7 is an exemplary diagram showing an MEC-Cloud linkage scenario between different services according to an embodiment of the present disclosure.

That is, in the present disclosure, as shown in FIG. 7, when searching for an MEC system (or MEP), appropriate for the MEC App Y with which linkage has been requested by the MEC App X, among MEC systems (or MEPs) registered in the federation manager 100(1) and MEC systems (or MEPs) registered in another federation manager is unsuccessful, linkage between the MEC App X, that is, App X in an MEC environment, and the cloud-App Y may be supported through the cloud as before.

As described above, in the present disclosure, a federation manager may be provided for each MNO (or MEC provider) which operates MEC, thereby implementing a structure which enables searching for/transmitting information among MEC systems managed by each federation manager. Furthermore, various linkage scenarios that provide direct linkage between each of MEC services installed in different MEC systems may be served based on the above-mentioned structure.

In this way, in the present disclosure, the effect of supporting inter-service linkage in an inter MEC environment is derived by realizing a structure which enables direct linkage between MEC services installed in different MEC systems.

For this reason, the present disclosure may contribute to the improvement of MEC service quality and the commercialization of MEC through inter-service linkage support in the inter MEC environment, and thus the effect of building a more complete MEC environment may also be expected.

Figure 8:
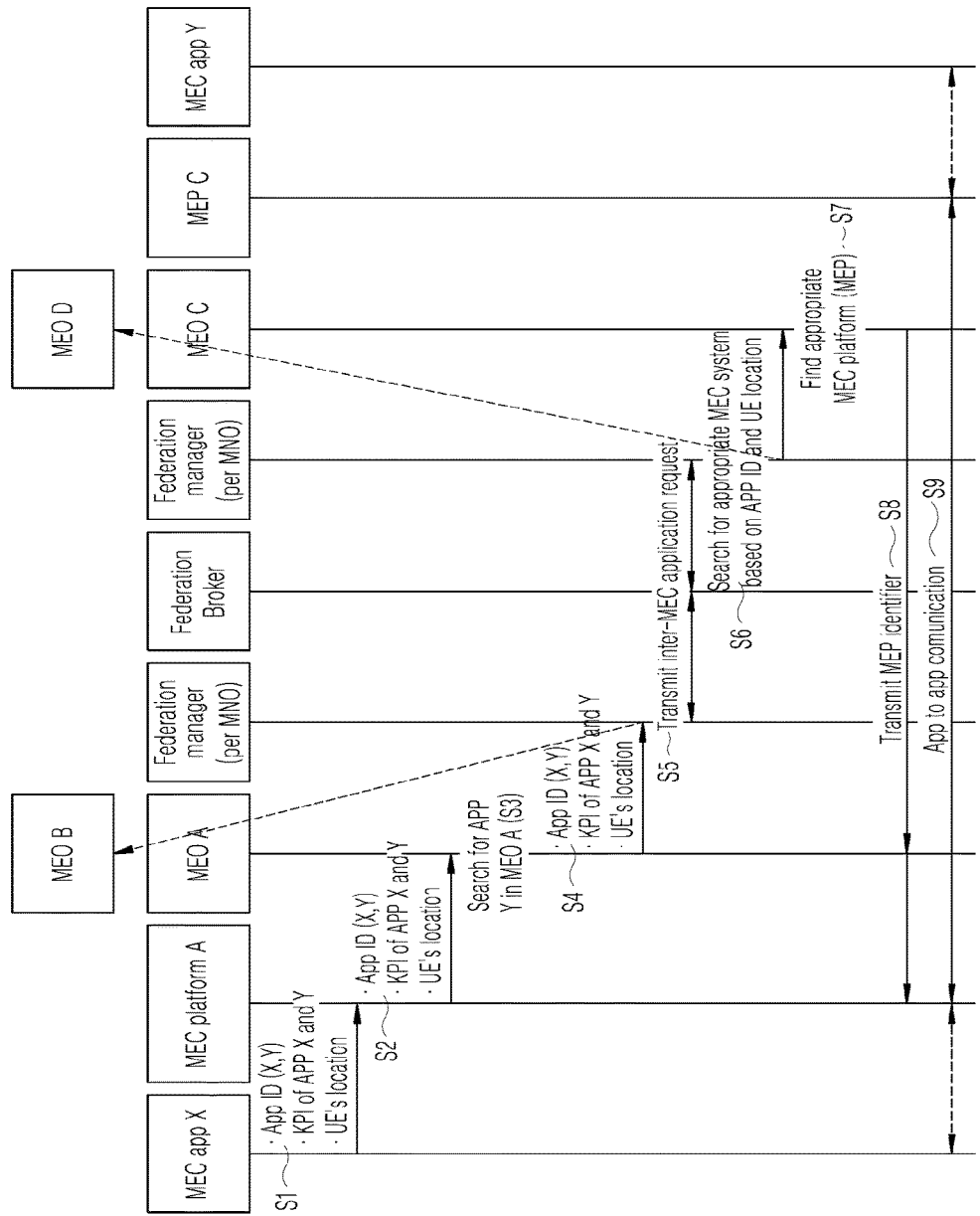
FIGS. 8 to 10 are call flow diagrams showing an inter MEC/inter MNO scenario among linkage scenarios between different services in an inter MEC environment according to an embodiment of the present disclosure.

Hereinafter, a call flow according to an embodiment of the Inter MEC/Inter MNO scenario (FIG. 5) among the inter-MEC service linkage scenarios realized by the present disclosure will be described with reference to FIGS. 8 to 10.

Referring to the embodiment in FIG. 8, an MEC App X transmits a request for linkage with an MEC App Y (hereinafter, inter-MEC application request) to an MEO A via an MEC platform (MEP) (the MEP A in FIG. 1) (S1, S2).

The inter-MEC application request may include identification information (e.g., an App ID) of the MEC App X, identification information (e.g., an App ID) of the MEC App Y to be linked, KPI of the MEC App Y, and location information (a UE location) of a terminal served by the MEC App X.

The MEO A, which has received the inter-MEC application request made by the MEC App X, identifies whether the MEC App Y, which is requested to be linked, is installed in an MEC system A (or the MEP A) associated with the MEO A, and whether the MEC App Y may satisfy the requested KPI, etc. (S3). When the MEC App Y is not installed or does not satisfy the requested KPI, etc., the MEO A transmits the current inter-MEC application request to a federation manager (S4).

When the MEC App X requests linkage with the MEC App Y, and when the MEC App Y is not installed in the MEC system A (or the MEP A) associated with MEO A or is installed but does not satisfy the requested KPI, etc., the federation manager may receive the inter-MEC application request according to the linkage request from the MEO A (S4).

When linkage triggering occurs as a result of receiving the inter-MEC application request, the federation manager may perform, based on information registered for each of MEOs A, B, . . . , a search for identifying whether there is the second MEC system in which the MEC App Y to be linked is installed and whether the requested KPI, etc. may be satisfied.

When the federation manager fails in searching for the second MEC system, in which the MEC App Y is installed, among the MEOs A, B, . . . , that is, wherein the second MEC system in which the MEC App Y is installed does not exist or exists but does not satisfy the requested KPI, etc., the federation manager may transmit the inter-MEC application request to other edge integration control devices (hereinafter, other federation managers) (S5).

The federation manager may transmit the inter-MEC application request to one or more federation managers.

Each of other federation managers that transmit/receive the inter-MEC application request is the federation manager of the present disclosure, and will identically implement the above-mentioned functions of the information register 110, the linkage request receiver 120, and the linkage controller 130.

That is, another federation manager having transmitted/received an inter-MEC application request may identify/search for whether there is a second MEC system (e.g., the MEC system C (or the MEP C)) in which a second MEC application, i.e., the MEC App Y, to be linked according to the current inter-MEC application request is installed, and whether the requested KPI, etc. are met (S6).

At this time, when searching for the second MEC system in which the MEC App Y is installed, another federation manager may perform the searching, based on the degree of proximity between the terminal and the system that is predefined based on location information (UE location) of the terminal served by the MEC App X in relation to the currently received inter-MEC application request and system location information (e.g., IP information, etc.) of each MEC system registered in another federation manager 100(2) (S6).

Accordingly, when searching the second MEC system (e.g., the MEC system C (or the MEP C)), in which the MEC App Y guaranteeing even the degree of proximity is installed, is successful, that is, when an appropriate MEP is found (S7), another federation manager transmits, to the MEC system A (or MEP A), the search result including information about the MEC system C (or the MEP C) required for direct communication between the first MEC system, that is, the MEC system A (or the MEP A), and the MEC system C (or the MEP C).

Specifically, an MEO C of the MEC system C (or the MEP C) searched/found by another federation manager directly transmits the information about the MEC system C (or the MEP C) (the search result) to the MEO A through an interface between MEOs, and the MEO A having received the same transmits the information about the MEC system C (or the MEP C) to the MEP A (S8).

In this way, the present disclosure enables communication between the MEC system A (or the MEP A) and the MEC system C (or the MEP C) through an embodiment in which the information about the MEC system C (or the MEP C) is transmitted using the interface between the MEOs, thereby enabling the MEC App X to be linked with the MEC App Y (S9).

Figure 9:
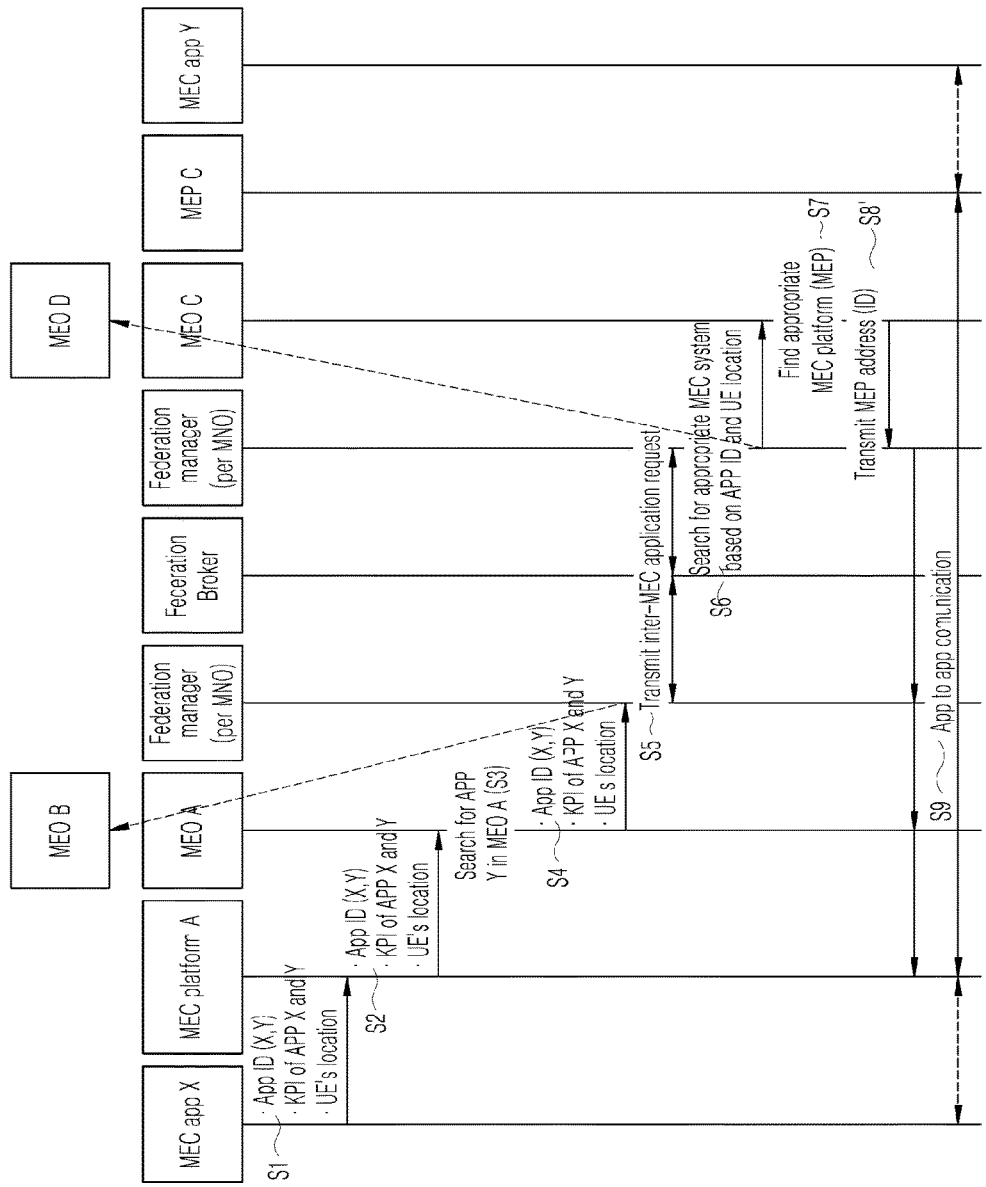
Figure 10:
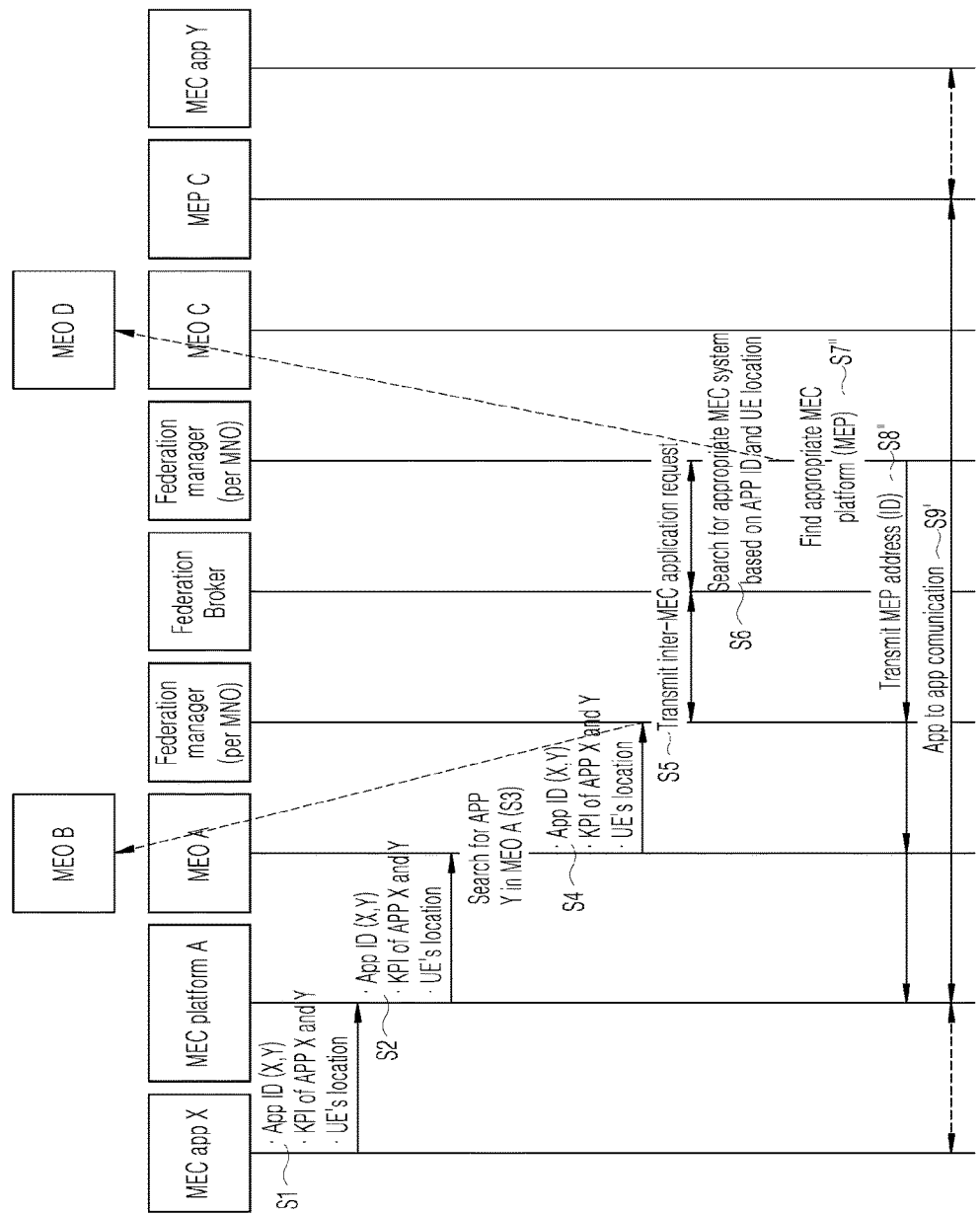

FIGS. 9 and 10 illustrate embodiments different from each other in a method for transmitting information about an MEC system C (or an MEP C) searched/found in another federation manager.

First, in the embodiment of FIG. 9, steps S1 and S2 in which an MEC App X transmits a request for linkage with an MEC App Y (hereinafter, inter-MEC application request) to an MEO A via an MEC platform (MEP) (the MEP A in FIG. 1) and the subsequent steps up to S7 are assumed to be identical to those in the embodiment in FIG. 8, and thus a detailed description thereof will be omitted.

Referring to the embodiment of FIG. 9, when searching a second MEC system (e.g., an MEC system C (or an MEP C)), in which the MEC App Y guaranteeing even the degree of proximity is installed, is successful, that is, when an appropriate MEP is found (S7), another federation manager may receive, from an MEO C, information about the MEC system C (or the MEP C) required for direct communication between a first MEC system, that is, an MEC system A (or an MEP A), and the MEC system C (or the MEP C), and may include the information about the MEC system C (or the MEP C) in the search result and transmit the search result to a federation manager (S8').

The federation manager having received the information about the MEC system C (or the MEP C) (the search result) may transmit the information about the MEC system C (or the MEP C) to the MEO A, and the MEO A, which has received the information, may transmit the information about the MEC system C (or the MEP C) to the MEP A (S8').

In this way, the present disclosure enables communication between the MEC system A (or the MEP A) and the MEC system C (or the MEP C) through an embodiment in which the information about the MEC system C (or the MEP C) is transmitted using the interface between federation managers, thereby enabling the MEC App X to be linked with the MEC App Y (S9').

Next, in the embodiment of FIG. 10, steps S1 and S2 in which an MEC App X transmits a request for linkage with an MEC App Y (hereinafter, inter-MEC application request) to an MEO A via an MEC platform (MEP) (the MEP A in FIG. 1) and the subsequent steps up to S6 are assumed to be identical to those in the embodiment in FIG. 8, and thus a detailed description thereof will be omitted.

Referring to the embodiment in FIG. 10, it is assumed that a federation manager already holds information about all MEPs managed by the federation manager.

Accordingly, when searching for, based on internally held information, a second MEC system (e.g., an MEC system C (or an MEP C)), in which the MEC App Y guaranteeing even the degree of proximity is installed, is successful, that is, when an appropriate MEP is found (S7"), another federation manager may include, in the search result, information about the MEC system C (or the MEP C) required for direct communication between a first MEC system, that is, an MEC system A (or the MEP A), and the MEC system C (or the MEP C) and may transmit the search result to a federation manager (S8").

The federation manager having received the information about the MEC system C (or the MEP C) (the search result) may transmit the information about the MEC system C (or the MEP C) to the MEO A, and the MEO A, which has received the information, may transmit the information about the MEC system C (or the MEP C) to the MEP A (S8").

In this way, the present disclosure enables communication between the MEC system A (or the MEP A) and the MEC system C (or the MEP C) through an embodiment in which the information about the MEC system C (or the MEP C) is transmitted using the interface between federation managers, thereby enabling the MEC App X to be linked with the MEC App Y (S9").

Thus, in the present disclosure, communication/linkage between the MEC App X and the MEC App Y may be supported through linkage between different MEC operators (e.g., the MEC A<->the MEC C) in different MEC infrastructure (e.g., MNO 1 and MNO 2) environments.

Figure 11:
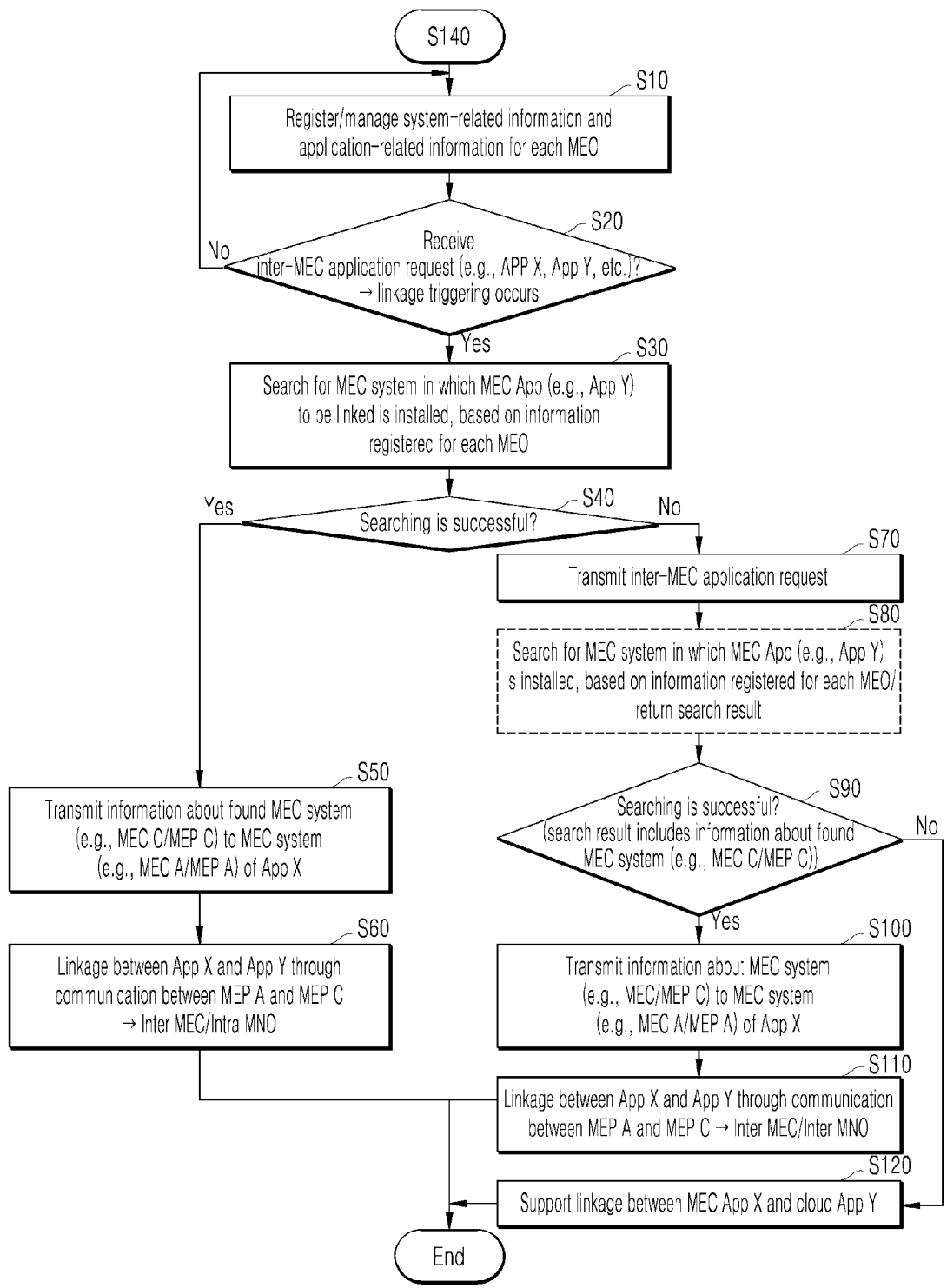
FIG. 11 is an operation flowchart illustrating an operation method of an edge integration control device (a federation manager) according to an embodiment of the present disclosure.

Hereinafter, an operation method of an edge integration control device (hereinafter, federation manager) according to an embodiment of the present disclosure will be described with reference to FIG. 11.

For convenience of description, the federation manager 100(1), among the federation managers 100(1), 100(2), ... for each MNO shown in FIG. 1, will be mentioned and described.

According to the operation method of the federation manager of the present disclosure, the federation manager 100(1) may receive information related to an MEC system associated with each MEO and at least one of MEC applications (hereafter, MEC Apps) installed in the MEC system from MEOs A, B, ... of MEC systems A, B, ... possessed by multiple MEC providers existing in MNO 1, and may register/manage the information (S10).

That is, the federation manager 100(1) may receive, from an MEO A, information about an MEC system A associated with the MEO A and about MEC Apps A, B, ... installed in the MEC system A, and register/manage the information, and may register/manage information received from each of the MEOs B, ... in this way, thereby registering/managing information related to the MEC systems A, B, ... existing in MNO 1.

More specifically, each MEC provider, that is, each MEO (e.g., the MEO A), registers information about each MEC system associated therewith in the federation manager 100 (1).

The information about each MEC system registered by each MEO (e.g., the MEO A) may be as follows.

MEO information: MEO identification information (e.g., MEO identifier), etc.

System-related information: Supportable (computing) resource information, current NW status information, MEC system location information (e.g., IP information, etc.), etc.

MEC application-related information: MEC App identification information (e.g., App ID), MEC APP-related KPI, etc.

The information about each MEC system, registered in the federation manager 100(1), may be updated and managed with the latest information through various criteria/events, etc.

As a result, each of the federation managers 100(1), 100(2), . . . of the present disclosure registers/manages information about MEC systems possessed by multiple MEC providers existing in an MNO managed thereby, and provides/implements, based thereon, a structure that enables searching for/transmitting information among the MEC systems according to a necessary situation.

According to the operation method of the federation manager of the present disclosure, when linkage triggering occurs as a result of receiving an inter-MEC application request (S20 Yes), the federation manager 100(1) may search for, based on information registered for each of the MEOs A, B, . . . , at least one of an MEC system and an MEC application which are to be linked according to the currently received inter-MEC application request (S30).

More specifically, the Federation manager 100(1) may receive, from a first MEO (e.g., the MEO A), an inter-MEC application request occurring when a first MEC application (e.g., an MEC App X) in a first MEC system (e.g., the MEC system A) associated with the first MEO (e.g., the MEO A) among the MEOs A, B, . . . existing in MNO 1 requests linkage with a second MEC application (e.g., an MEC App Y) different from the first MEC application.

The inter-MEC application request may include identification information (e.g., an App ID) of the MEC App X, identification information (e.g., an App ID) of the MEC App Y to be linked, KPI of the MEC App X and the MEC App Y, and location information (a UE location) of a terminal served by the MEC App X.

The federation manager 100(1) may search for, based on the information registered for each of the MEOs A, B, . . . , a second MEC system in which the second MEC application, i.e., the MEC App Y, to be linked according to the current inter-MEC application request is installed (S30).

More specifically, the Federation manager 100(1) may perform, based on the information registered for each of the MEOs A, B, . . . , a search for identifying whether there is the second MEC system in which the MEC App Y is installed and whether a requested KPI, etc. may be satisfied.

Accordingly, when the second MEC system, in which the MEC App Y is installed, is found among the MEOs A, B, . . . , that is, when the second MEC system (e.g., an MEC system C (or an MEP C), in which the MEC App Y is installed, is present and satisfies the requested KPI, etc. (S40 Yes), the federation manager 100(1) transmits information about the MEC system C (or the MEP C) to the first MEC system, that is, the MEC system A (or the MEP A) (S50).

In this way, the federation manager 100(1) may transmit the information (e.g., an MEP ID) about the MEC system C (or the MEP C), in which the MEC App Y is installed, to the MEC system A (or the MEP A) so that the MEC App X is linked with the MEC App Y through communication between the MEC system A (or the MEP A) and the MEC system C (or the MEP C) (S60).

That is, in the present disclosure, communication/linkage between the MEC App X and the MEC App Y is supported through linkage between different MEC operators (e.g., the MEC A<->the MEC C) in the same MEC infrastructure environment. This case corresponds to an Inter MEC/Intra MNO scenario shown in FIG. 4.

According to the operation method of the federation manager of the present disclosure, when the second MEC system (e.g., the MEC system C (or the MEP C)), in which the MEC App Y is installed, does not exist, or exists but does not satisfy the requested KPI, etc., the federation manager 100(1) may determine that the search is unsuccessful (S40 No), and may transmit an inter-MEC application request to other edge integration control devices (hereinafter, other federation managers) (S70).

Each of other federation managers that transmit/receive an inter-MEC application request is the federation manager of the present disclosure, and will identically implement the above-mentioned functions of the information register 110, the linkage request receiver 120, and the linkage controller 130.

For convenience of description, another federation manager 100(2) will be described.

The other federation manager 100(2) may identify/search for, based on information registered for each MEO existing in MNO 2 registered in the federation manager 100(2), whether there is the second MEC system (e.g., the MEC system C (or the MEP C)) in which the MEC App Y to be linked according to the current inter-MEC application request is installed, and whether the requested KPI, etc. are met, and will return/transmit the search result to the federation manager 100(1) (S80).

At this time when searching for the second MEC system in which the MEC App Y is installed, the other federation manager 100(2) may perform the searching, based on the degree of proximity between the terminal and the system that is predefined based on location information (UE location) of the terminal served by the MEC App X in relation to the currently received inter-MEC application request and system location information (e.g., IP information, etc.) of each MEC system registered in the other federation manager 100(2).

Accordingly, when searching the second MEC system (e.g., the MEC system C (or the MEP C)), in which the MEC App Y guaranteeing even the degree of proximity is installed, is successful, the other federation manager 100(2) may include, in the search result, information about the MEC system C (or the MEP C) required for direct communication between the first MEC system, that is, the MEC system A (or the MEP A), and the MEC system C (or the MEP C), and may include the information about the MEC system C (or the MEP C) and transmit the search result (S80).

According to the operation method of the federation manager of the present disclosure, when the search result returned/transmitted from the other federation manager 100 (2) includes the information about the MEC system C (or the MEP C), the federation manager 100(1) determines that the searching is successful (S90 Yes), and transmits the information about the MEC system C (or the MEP C) to the MEC system A (or the MEP A) (S100).

In this way, the federation manager 100(1) may transmit the information (e.g., an MEP ID) about the MEC system C (or the MEP C), in which the MEC App Y is installed, to the MEC system A (or the MEP A) so that the MEC App X is linked with the MEC App Y through communication between the MEC system A (or the MEP A) and the MEC system C (or the MEP C) (S110).

Thus, in the present disclosure, communication/linkage between the MEC App X and the MEC App Y are supported through linkage between different MEC operators (e.g., the MEC A<->the MEC C) in different MEC infrastructure (e.g., MNO 1 and MNO 2) environments. This case will correspond to the Inter MEC/Inter MNO scenario shown in FIG. 5.

According to the operation method of the federation manager of the present disclosure, when it is determined, from the returned/transmitted search result, that the searching is unsuccessful (S90 No), the federation manager 100(1) may support linkage between the MEC App X and a cloud-App Y (S120).

That is, in the present disclosure, as shown in FIG. 7, when searching for an MEC system (or an MEP), appropriate for the MEC App Y with which linkage has been requested by the MEC App X, among MEC systems (or MEPs) registered in the federation manager 100(1) and MEC systems (or MEPs) registered in another federation manager is unsuccessful, linkage between the MEC App X, that is, App X in an MEC environment, and the cloud-App Y may be supported through the cloud as before.

As described above, in the present disclosure, a federation manager may be provided for each MNO (or MEC provider) which operates MEC, thereby implementing a structure which enables searching for/transmitting information among MEC systems managed by each federation manager. Furthermore, various linkage scenarios that provide direct linkage between each of MEC services installed in different MEC systems may be served based on the above-mentioned structure.

In this way, in the present disclosure, the effect of supporting inter-service linkage in an inter MEC environment is derived by realizing a structure which enables direct linkage between MEC services installed in different MEC systems.

For this reason, the present disclosure may contribute to the improvement of MEC service quality and the commercialization of MEC through inter-service linkage support in the inter MEC environment, and thus the effect of building a more complete MEC environment may also be expected.

As described above, the operation method of the federation manager according to the present disclosure may be implemented in the form of a program command capable of being executed through various computer means, and may be recorded in a computer-readable medium. The computer-readable medium may include program commands, data files, data structures, etc. alone or in combination. The program commands recorded in the medium may be specially designed and configured for the present disclosure, or may be known to and usable by those skilled in computer software. Examples of the computer-readable recording medium include magnetic media such as a hard disk, a floppy disk, and a magnetic tape, optical media such as CD-ROM and DVD, and magneto-optical media such as a floptical disk, and hardware devices specially configured to store and execute program commands, such as ROM, RAM, flash memory, etc. Examples of the program commands may include high-level language codes, which can be executed in a computer by using an interpreter, as well as machine language codes made by a compiler. The above-described hardware devices may be configured to operate as one or more software modules in order to perform the operation of the present disclosure, and vice versa.

Hereinbefore, the present disclosure has been described in detail with reference to various embodiments, but the present disclosure is not limited to the above-described embodiments. Those skilled in the art to which the present disclosure belongs will understand that the technical idea of the present disclosure extends to the extent that various changes or modifications can be made without departing from the subject matter of the present disclosure claimed in the following claims.

The invention claimed is:

1. An edge integration control device comprising:
    an information register configured to acquire, from at least one Multi-access Edge Computing (MEC) Orchestrator (MEO), information related to at least one MEC system associated with the at least one MEO and at least one of MEC applications installed in the MEC system, and register the information in the information register; and
    a linkage controller configured to:
        receive an inter-MEC application request from a first MEO of the at least one MEO, the received inter-MEC application request includes identification information of a first MEC application and identification information of a second MEC application, wherein the inter-MEC application request is received when the first MEC application in a first MEC system associated with the first MEO requests linkage with the second MEC application, wherein the inter-MEC application request from the first MEO is received at the linkage controller when the first MEC application requests the linkage with the second MEC application and the second MEC application is not installed in the MEC system associated with the first MEO, and
        in response to receiving the inter-MEC application request, to search for at least one of a MEC application and a MEC system to be linked based on the information registered in the information register for each of the at least one MEO, and
    wherein the edge integration control device, which comprises the information register and the linkage controller, is disposed external from the first MEO.

2. The edge integration control device of claim 1, wherein the inter-MEC application request includes at least one of Key performance indicator (KPI), and location information of a terminal served by the first MEC application in relation to the inter-MEC application request.

3. The edge integration control device of claim 1, wherein the information acquired and registered in the information register from the at least one MEO comprises:
    information about each MEO,
    system-related information comprising at least one of MEC system resource information, network status information, and system location information for each MEC system, and
    MEC application-related information comprising at least one of KPI and identification information of each MEC application installed in MEC system for each MEC system.

4. The edge integration control device of claim 1, wherein the linkage controller is configured to:
    search for a second MEC system in which the second MEC application to be linked is installed, based on the information registered in the information register for each of the at least one MEO, and
    transmit information about the second MEC system to the first MEC system when the second MEC system in which the second MEC application is installed is found, so that the first MEC application is capable of being linked with the second MEC application through communication between the first MEC system and the second MEC system.

5. The edge integration control device of claim 4, wherein the linkage controller is configured to, when the second MEC system in which the second MEC application is installed is not found, transmit the inter-MEC application request to another edge integration control device such that a result of searching for the second MEC system in which the second MEC application to be linked is installed among MEC systems registered in the other edge integration control device is transmitted to the first MEC system.

6. The edge integration control device of claim 5, wherein the search result transmitted to the first MEC system comprises information about the second MEC system necessary for communication between the first MEC system and the second MEC system when the second MEC system in which the second MEC application is installed, is found in the other edge integration control device, and the linkage controller is configured to transmit the information about the second MEC system included in the search result to the first MEC system so that the first MEC application is capable of being linked with the second MEC application through the communication between the first MEC system and the second MEC system.

7. The edge integration control device of claim 5, wherein the linkage controller is configured to support linkage between the first MEC application and the second MEC application in a cloud environment when the second MEC system in which the second MEC application is installed is not found in the other edge integration control device.

8. An edge integration control device comprising:
an information register configured to acquire, from at least one MEO, information related to at least one MEC system associated with the at least one MEO and at least one of MEC applications installed in the at least one MEC system, and register the information in the information register; and
a linkage controller configured to, when an inter-MEC application request is transmitted from another edge integration control device based on a first MEC application requests linkage with a second MEC application different from the first MEC application, the inter-MEC application request includes identification information of the first MEC application and identification information of the second MEC application, wherein the inter-MEC application request is received when the first MEC application in a first MEC system associated with the first MEO requests linkage with the second MEC application, wherein the inter-MEC application request from the first MEO is received at the linkage controller when the first MEC application requests the linkage with the second MEC application and the second MEC application is not installed in the MEC system associated with the first MEO, and the linkage controller configured to search for, based on the information registered in the information register for each of the at least one MEO, at least one of a MEC system and a MEC application to be linked according to the inter-MEC application request, and
wherein the edge integration control device, which comprises the information register and the linkage controller, is disposed external from the at least one MEO.

9. The edge integration control device of claim 8, wherein the linkage controller is configured to, when searching for a second MEC system in which the second MEC application to be linked is installed, perform the searching based on a degree of proximity between a terminal and a system, wherein the degree of proximity between the terminal and the system is predefined based on system location information of each MEC system registered in the information register and location information of the terminal being served by the first MEC application in relation to the inter-MEC application request.

10. The edge integration control device of claim 8, wherein the linkage controller is configured to transmit a search result according to the inter-MEC application request to a first MEC system in which the first MEC application is installed.

11. The edge integration control device of claim 10, wherein the linkage controller is configured to, when a second MEC system in which the second MEC application to be linked is installed is found, control a MEO associated with the second MEC system to transmit a search result to a MEO associated with the first MEC system through an interface between the MEOs, wherein the search result comprises information about the second MEC system necessary for communication between the first MEC system and the second MEC system.

12. The edge integration control device of claim 10, wherein the linkage controller is configured to, when a second MEC system in which the second MEC application to be linked is installed is found, transmit a search result to a MEO associated with the first MEC system via the other edge integration control device through an interface between the edge integration control devices, wherein the search result comprises information about the second MEC system necessary for communication between the first MEC system and the second MEC system.

13. An operation method of an edge integration control device, the operation method comprising:
acquiring, from at least one MEO, information related to at least one MEC system associated with the at least one MEO and at least one of MEC applications installed in the MEC system, and registering the information;
receiving an inter-MEC application request from a first MEO of the at least one MEO for triggering a linkage, the inter-MEC application request includes identification information of a first MEC application and identification information of a second MEC application, wherein the inter-MEC application request is received when the first MEC application in a first MEC system associated with the first MEO requests linkage with the second MEC application, wherein the inter-MEC application request from the first MEO is received when the first MEC application requests the linkage with the second MEC application and the second MEC application is not installed in the MEC system associated with the first MEO; and
searching for, based on the information registered for each of the at least one MEO, at least one of the second MEC application and a MEC system to be linked.

14. An operation method of an edge integration control device, the operation method comprising:
acquiring, from at least one MEO, information related to at least one MEC system associated with the at least one MEO and at least one of MEC applications installed in the at least one MEC system, and registering the information;
receiving an inter-MEC application request for triggering a linkage, the inter-MEC application request includes identification information of a first MEC application and identification information of a second MEC application, wherein the inter-MEC application request is received when the first MEC application requests linkage with the second MEC application, wherein the inter-MEC application request from the first MEO is received when the first MEC application requests the linkage with the second MEC application and the second MEC application is not installed in the MEC system associated with the first MEO; and searching for, when the inter-MEC application request is transmitted from another edge integration control device when the first MEC application requests linkage with the second MEC application different from the first MEC application, at least one of a MEC application and a MEC system to be linked according to the inter-MEC application request based on the information registered for each of the at least one MEO.

* * * * *